(12) United States Patent
Suetsugu et al.

(10) Patent No.: US 7,573,645 B2
(45) Date of Patent: Aug. 11, 2009

(54) METHOD FOR MANUFACTURING OPTICAL ELEMENT OF REFRACTIVE INDEX DISTRIBUTION TYPE

(75) Inventors: Tatsuya Suetsugu, Osaka (JP); Norimasa Kominami, Osaka (JP); Takeshi Ohtani, Osaka (JP); Naoko Kaga, Osaka (JP); Hiroaki Yokoi, Osaka (JP); Minoru Takada, Osaka (JP); Takashi Tarumi, Osaka (JP); Toshihiko Einishi, Osaka (JP); Kohei Kadono, Ikeda (JP)

(73) Assignees: Isuzu Glass Co., Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 528 days.

(21) Appl. No.: 10/589,725

(22) PCT Filed: Feb. 15, 2005

(86) PCT No.: PCT/JP2005/002245

§ 371 (c)(1),
(2), (4) Date: Aug. 17, 2006

(87) PCT Pub. No.: WO2005/080283

PCT Pub. Date: Sep. 1, 2005

(65) Prior Publication Data

US 2008/0204889 A1   Aug. 28, 2008

(51) Int. Cl.
 G02B 3/00     (2006.01)
 C03C 15/00    (2006.01)
(52) U.S. Cl. .................. 359/652; 359/653; 359/654; 359/655; 65/30.13; 65/57
(58) Field of Classification Search ......... 359/652–655; 65/30.13, 57
 See application file for complete search history.

(56) References Cited

U.S. PATENT DOCUMENTS 3,873,408 A     3/1975   Hensler (Continued)

FOREIGN PATENT DOCUMENTS

JP        61-256946 A    11/1986

(Continued)

OTHER PUBLICATIONS

Masayuki Yamane et al., "Glass Kogaku Handbook", 1$^{st}$ Edition, Jul. 5, 1999, p. 16, table 2.14 (Cited in the International Search Report mailed on May 17, 2005 during the international phase of corresponding PCT/JP2005/002245 application.).

(Continued)

*Primary Examiner*—Evelyn A. Lester
(74) *Attorney, Agent, or Firm*—Posz Law Group, PLC

(57) ABSTRACT

The present invention provides a method of producing a graded refractive index optical element, the method being capable of easily forming a graded refractive index distribution in a desired portion of a glass substrate without the need for a specific treatment atmosphere, and without using a molten salt. More specifically, the present invention provides a method of producing a graded refractive index optical element comprising applying a paste containing a copper compound, an organic resin and an organic solvent to a glass substrate containing an alkali metal component as a glass component, and then performing heat treatment at a temperature below the softening temperature of the glass substrate.

12 Claims, 2 Drawing Sheets

U.S. PATENT DOCUMENTS

| | | | |
|---|---|---|---|
| 3,997,312 A | 12/1976 | Besselink | |
| 4,952,037 A | 8/1990 | Oikawa et al. | |
| 5,442,482 A * | 8/1995 | Johnson et al. | 359/619 |
| 6,529,675 B1 | 3/2003 | Hayden et al. | |
| 2003/0161048 A1* | 8/2003 | Tsuda et al. | 359/652 |
| 2005/0152657 A1 | 7/2005 | Suetsugu et al. | |

FOREIGN PATENT DOCUMENTS

| | | |
|---|---|---|
| JP | A-61-256946 | 11/1986 |
| JP | 04-181201 A | 6/1992 |
| JP | A-4-181201 | 6/1992 |
| JP | A-2000-103646 | 4/2000 |
| JP | A-2003-300750 | 10/2003 |

OTHER PUBLICATIONS

Supplementary European Search Report issued on Mar. 9, 2009 from the European Patent Office in the corresponding European patent application No. 05719147.0 — 2111.

* cited by examiner

METHOD FOR MANUFACTURING OPTICAL ELEMENT OF REFRACTIVE INDEX DISTRIBUTION TYPE

TECHNICAL FIELD

The present invention relates to a method of producing a graded refractive index optical element.

BACKGROUND ART

In the field of optical communications, optical fiber collimators are conventionally used to emit signal light, which has been transmitted through an optical fiber, in the form of parallel light from the optical fiber, or in reverse, used to converge parallel light on one end surface of an optical fiber to cause the light to enter the optical fiber. When using such an optical fiber collimeter, interposition of an optically functional element (for example, an optical filter, optical isolator, optical switch, optical modulator, etc.) between a pair of collimator lenses can provide a desired effect on the signal light transmitted through a single mode optical fiber at the light-entering side and then converge the signal light to further transmit the light to a single mode optical fiber at the light-receiving side.

Various forms of lenses have been used as collimating lenses for optical fiber collimators. However, cylindrical graded refractive index lenses (also referred to as "rod lenses" or "GRIN lenses") are generally used because of their ease of polishing and like processing during manufacture, compared to spherical lens and complicated non-spherical lenses. Such graded refractive index lenses work as lenses, for example, converging light, because the interior of the rod glass has a continuous refractive index distribution in the radial direction from the center.

To produce such graded refractive index lenses, ion-exchange methods, double crucible methods, CVD methods (vapor-phase deposition methods), sol-gel methods, rod-in-tube methods, and like methods are known as techniques for forming a graded refractive index distribution in the radial direction of a glass rod. Among these, ion exchange is the most typical method for producing a graded refractive index lens and comprises immersing a homogeneous glass rod into a molten salt containing a monovalent cation (e.g., $K^+$, $Tl^+$, $Ag^+$) to exchange a monovalent cation in the glass (e.g., $Na^+$) for the monovalent cation in the molten salt, thereby forming a graded refractive index distribution. For example, Patent Document 1 discloses a method of producing a graded refractive index lens comprising subjecting a Na-containing glass rod to ion exchange using a molten salt containing $Ag^+$ to form a graded reflective index distribution in the radial direction of the rod.

Microlens arrays comprising an array of lenses with a diameter of about several tens of micrometers to submillimeter, each lens having a graded refractive index distribution formed by subjecting a planer glass to ion exchange, are being used as computer board connectors or light source collimaters.

When a graded refractive index lens is produced by an ion exchange method, the temperature of the molten salt used is usually in the range of about 250° C. to about 400° C., and the manufacturing facility costs less than that of vapor-phase methods such as CVD. Moreover, compared to manufacturing spherical lenses, ion exchange methods are advantageous in terms of ease of polishing. However, conventional ion exchange methods have problems as below:

The first problem is the control of conditions of the molten salt at the time of ion exchange. The ion exchange rate and the rate of ion diffusion in a glass substrate depend on the temperature of the molten salt. The liquid phase temperature of the molten salt depends on the mixing ratio (composition) of the molten salt, and the ion exchange temperature can be controlled only at temperatures not lower than the liquid phase temperature of the molten salt. Therefore, there are cases in which the concentration of ions in the molten salt and the ion exchange temperature cannot be controlled independently. Therefore, to produce a graded refractive index lens having a desired refractive index profile by an ion exchange method, it is not easy to select the appropriate ion exchange conditions such as the molten salt composition, temperature, immersion time, etc., and a high level of expertise is needed. Furthermore, when using ions that are prone to oxidation in air, ion exchange needs to be performed in a reducing atmosphere. These problems are encountered not only in the production of graded refractive index lenses but are also common problems in the production of graded refractive index optical elements by introducing a graded refractive index distribution into a glass substrate.

The second problem is the application of an ion exchange-blocking film. When ion exchange is performed using a molten salt, it is necessary to apply an ion exchange-blocking film over the entire substrate except the portion where a graded refractive index distribution is to be formed. Photolithography is generally used to apply an ion exchange-blocking film, but formation of such a blocking film requires a complicated process. This is also a common problem in the production of graded refractive index optical elements by introducing a graded refractive index distribution into a glass substrate. Patent Document 1: Japanese Unexamined Patent Publication No. 2001-159702

DISCLOSURE OF THE INVENTION

Problems to be Solved by the Invention

A primary object of the present invention is to provide a method of producing a graded refractive index optical element, the method being capable of easily forming a graded refractive index distribution in a desired portion of a glass substrate without the need for a specific treatment atmosphere and without using a molten salt.

Means for Solving the Problem

The present inventors carried out extensive research to achieve the above object. As a result, it was found that when using a production method comprising diffusing copper ions into a glass substrate using a specific paste containing a copper compound to form a different refractive index region in the glass substrate, the above object can be achieved. The present invention has been accomplished, based on this finding.

More specifically, the present invention relates to the following methods of producing graded refractive index optical elements.

1. A method of producing a graded refractive index optical element comprising applying a paste containing a copper compound, an organic resin and an organic solvent to a glass substrate containing an alkali metal component as a glass component and then performing heat treatment at a temperature below the softening temperature of the glass substrate.

2. The method according to item 1 wherein the graded refractive index optical element is a lens, lens array or diffraction grating.

3. The method according to item 1 or 2 wherein the glass substrate is made of a glass containing at least 2% by weight of alkali metal, calculated on an oxide basis, the glass being a silicate glass, borosilicate glass, phosphate glass, or fluorophosphate glass.

4. The method according to item 3 wherein the glass substrate is a borosilicate glass substrate containing 40 to 82% by weight of $SiO_2$, 12 to 50% by weight of $B_2O_3$, 2 to 25% by weight of at least one member selected from $Na_2O$, $K_2O$, $Li_2O$, $Rb_2O$ and $Cs_2O$; not more than 25% by weight of at least one member selected from MgO, CaO, BaO, ZnO, SrO and PbO; not more than 20% by weight of at least one member selected from $Al_2O_3$, $La_2O_3$, $Y_2O_3$, $Ta_2O_3$ and $Gd_2O_3$; not more than 10% by weight of at least one member selected from $Nb_2O_5$ and $ZrO_2$; not more than 5% by weight of at least one member selected from $As_2O_3$, $Sb_2O_3$ and SnO; and 0.05 to 10% by weight of at least one member selected from Cl, Br and I.

5. A graded refractive index optical element produced by the method of any one of items 1 to 4.

6. The graded refractive index optical element according to item 5 which is a lens, lens array or diffraction grating.

The method of producing a graded refractive index optical element according to the invention is described below in detail. The graded refractive index optical element of the invention refers to an element that exhibits a desired optical property by utilizing a region formed in at least a portion of a glass substrate, the region having a refractive index distribution different from that of the rest of the substrate. Specific examples of such optical elements include graded refractive index lens, graded refractive index lens arrays, diffraction gratings, and the like.

In the method of the invention, it is necessary to use a glass substrate containing an alkali metal component as a glass component.

Examples of the alkali metal component contained in the glass substrate include Li, Na, K, Rb, Cs, etc. Among these, Li, Na, K, etc. are preferable, and Na is particularly preferable. Such alkali metals may exist in an ionic state, or may exist as an oxide. Such alkali metals may be used singly or as a combination of two or more such metals.

The alkali metal content of the glass substrate is suitably at least about 2% by weight, preferably at least about 5% by weight, and more preferably at least about 10% by weight, calculated on an oxide basis. Although the maximum alkali metal content of the glass substrate is not particularly limited, the maximum content is suitably about 40% by weight, preferably about 30% by weight, and more preferably about 20% by weight, calculated on an oxide basis.

In the present invention, any glass containing an alkali metal component can be used without particular limitation. For example, a silicate glass, borosilicate glass, phosphate glass, fluorophosphate glass, etc. can be used.

The compositions of such glasses for use are not particularly limited. Any glass containing an alkali metal as described above and having a known silicate glass, borosilicate glass, phosphate glass, fluorophosphate glass or like glass composition can be used without particular limitation.

Specific examples of such glass compositions include the following compositions shown in 1) to 4), calculated on an oxide basis:

1) silicate glass containing 40 to 80% by weight, and preferably 50 to 75% by weight, of $SiO_2$; 5 to 25% by weight, and preferably 17 to 20% by weight, of CaO; 5 to 25% by weight, and preferably 7 to 20% by weight, of at least one member selected from $Na_2O$, $K_2O$, $Li_2O$, $Rb_2O$ and $Cs_2O$; not more than 2% by weight, and preferably not more than 1.5% by weight, of at least one member selected from MgO, BaO, ZnO, SrO and PbO (the minimum amount is preferably about 0.1% by weight to fully achieve the desired effects); not more than 15% by weight, and preferably not more than 10% by weight, of $Al_2O_3$ (the minimum amount is preferably about 0.5% by weight to fully achieve the desired effects); and not more than 3% by weight, and preferably not more than 1% by weight, of at least one member selected from $Fe_2O_3$ and $SO_3$ (the minimum amount is preferably about 0.05% by weight to fully achieve the desired effects);

2) borosilicate glass containing 20 to 80% by weight, and preferably 30 to 75% by weight, of $SiO_2$; 3 to 50% by weight, and preferably 5 to 30% by weight, of $B_2O_3$; 2 to 20% by weight, and preferably 5 to 15% by weight, of at least one member selected from $Na_2O$, $K_2O$, $Li_2O$, $Rb_2O$ and $Cs_2O$; not more than 30% by weight, and preferably not more than 25% by weight, of at least one member selected from MgO, CaO, BaO, ZnO, SrO and PbO (the minimum amount is preferably about 1% by weight to fully achieve the desired effects); not more than 15% by weight, and preferably not more than 10% by weight, of at least one member selected from $Al_2O_3$, $La_2O_3$, $Y_2O_3$, $Ta_2O_3$ and $Gd_2O_3$ (the minimum amount is preferably about 0.5% by weight to fully achieve the desired effects); not more than 2% by weight, and preferably not more than 1% by weight, of at least one member selected from $Nb_2O_5$ and $ZrO_2$ (the minimum amount is preferably about 0.05% by weight to fully achieve the desired effects); and not more than 2% by weight, and preferably not more than 1% by weight, of at least one member selected from $As_2O_3$, $Sb_2O_3$ and SnO (the minimum amount is preferably about 0.01% by weight to fully achieve the desired effects);

3) phosphate glass containing 40 to 80% by weight, and preferably 50 to 75% by weight, of $P_2O_5$; not more than 20% by weight, and preferably not more than 10% by weight of, $SiO_2$ (the minimum amount is preferably about 0.5% by weight to fully achieve the desired effects); 2 to 20% by weight, and preferably 5 to 15% by weight, of at least one member selected from $Na_2O$, $K_2O$, $Li_2O$, $Rb_2O$ and $Cs_2O$; 2 to 50% by weight, and preferably 5 to 45% by weight, of at least one member selected from the group consisting of MgO, CaO, BaO, ZnO, SrO and PbO; not more than 15% by weight, and preferably not more than 10% by weight, of at least one member selected from $B_2O_3$, $Al_2O_3$, $La_2O_3$, $Y_2O_3$, $Ta_2O_3$, $Nd_2O_3$ and $Gd_2O_3$ (the minimum amount is preferably about 0.5% by weight to fully achieve the desired effects); and not more than 2% by weight, and preferably not more than 1% by weight, of at least one member selected from $Nb_2O_5$ and $ZrO_2$ (the minimum amount is preferably about 0.01% by weight to fully achieve the desired effects); and 4) fluorophosphate glass obtained by substitution of F (fluorine) for some of the 0 (oxygen) of an original composition containing 20 to 50% by weight, and preferably 30 to 40% by weight, of $P_2O_5$; 5 to 30% by weight, and preferably 10 to 25%, of $Al_2O_3$; 2 to 20% by weight, and preferably 5 to 15% by weight, of at least one member selected from $Na_2O$, $K_2O$, $Li_2O$, $Rb_2O$ and $Cs_2O$; and 10 to 50% by weight; and preferably 20 to 40% by weight, of at least one member selected from MgO, CaO, BaO, ZnO and SrO.

The form of such a glass substrate is not particularly limited and can be suitably determined according to the purpose of the final product. For example, a wide variety of forms suitable for lenses, lens arrays, and diffraction gratings can be used, and specific examples thereof are plates, cylindrical columns, rectangular columns, and the like. For example, substrates formed into a desired shape by grinding a mass of glass having a composition as described above, and substrates formed by molding a molten glass into a desired shape and then optionally polishing may be used.

The method of the present invention comprises applying a paste containing a copper compound to such a glass substrate containing an alkali metal component as a glass component, and performing heat treatment at a temperature below the softening temperature of the glass substrate.

The paste for use is one obtained by dispersing a copper compound and an organic resin in an organic solvent and forming a paste. Any such paste can be used as long as the paste has a viscosity that allows its application to a glass substrate and it contains a copper compound capable of diffusing copper ions by heat treatment. More specifically, the paste viscosity can be suitably selected in consideration of the application method, paste composition, diffusion conditions into the substrate, etc.

The copper compound contained in the paste is diffused into the glass substrate as copper ions by ion exchange with an alkali metal component of the glass substrate by applying the paste to the glass substrate and performing heat treatment. The portion containing such dispersed copper ions has a refractive index different from that of the rest of the glass substrate, the refractive index having a continuous distribution that varies according to the concentration of diffused ions. Although copper ions can be monovalent or divalent cations, the copper contained in the paste is presumably diffused mainly as monovalent cations. This is presumably because the organic resin contained in the paste is carbonized to produce a reducing atmosphere, by which monovalent copper ions are formed.

The copper compound contained in the paste is not particularly limited as long as it is an ionic copper compound capable of diffusing copper ions into a glass substrate by heat treatment, and may be a monovalent or divalent copper compound. Examples of such copper compounds include inorganic salts.

Specific examples of such copper compounds include $CuSO_4$, $CuCl$, $CuCl_2$, $CuBr$, $CuBr_2$, $Cu_2O$, $CuO$, $Cu(NO_3)_2$, $CuS$, $CuI$, $Cu(NO_3) \cdot 3H_2O$, etc. Among these, $CuSO_4$, $Cu(NO_3)_2$, and the like are preferable. Such copper compounds can be used singly or as a combination of two or more such compounds.

The organic resin to be contained in the paste is one that decomposes at the heat treatment temperature. Preferable are resins that are capable of easily producing a reducing atmosphere by their decomposition and carbonization and easily removable by washing with water. Examples of such resins include cellulose resins, methyl cellulose resins, cellulose acetate resins, cellulose nitrate resins, cellulose acetate butyrate resins, acrylic resins, petroleum resins, etc. Such organic resins can be used singly or as a combination of two or more such resins.

The organic solvent used in the paste is preferably a solvent in which a copper compound and an organic resin can be easily dispersed and which easily volatilizes when dried. More specifically, a solvent that is a liquid at room temperature (about 20° C.) and volatilizes at a temperature of about 50° C. to about 200° C. is preferable. Examples of such solvents include alcohols such as methanol, ethanol, etc.; dimethyl ether; ketones such as acetone, etc.; and so on.

Although the content of each component in the paste is not particularly limited, the amount of organic solvent is usually about 5 to 30 parts by weight, and preferably about 7 to about 25 parts by weight, and the amount of resin component is usually about 20 to about 55 parts by weight, and preferably about 25 to about 45 parts by weight, per 100 parts by weight of copper compound.

If necessary, additives may be incorporated into the paste. For example, $Na_2SO_4$, $K_2SO_4$, $NaNO_3$, $KNO_3$, $NaCl$, $NaBr$, $KCl$, $KBr$, $NaI$, $KI$, etc. can be used as additives to lower the melting point of the copper compound. Among these, $Na_2SO_4$, $K_2SO_4$, $NaNO_3$, $KNO_3$, and the like are preferable. Although the amount of such additives is not particularly limited, the amount may be about 5 to about 25 parts by weight, and preferably about 10 to about 20 parts by weight, per 100 parts by weight of copper compound.

According to the method of the invention, the paste is first applied to a glass substrate. The shape of the applied paste is not particularly limited and can be suitably arranged according to the properties of the optical element. For example, when a graded refractive index lens is produced, the paste may be applied to a desired portion of the substrate to form a shape usable as the lens. More specifically, when the paste is applied as circle(s), the radius of the circle(s) is usually about 5 μm to about 1 mm, and preferably about 10 μm to about 0.5 mm. When a lens array is produced, the patterning interval, circle or dot size, etc. can be suitably adjusted according to the desired lens pattern. Although the patterning interval is not particularly limited, it is usually 1 cm or less, preferably 500 μm or less, and more preferably 250 μm or less.

The method of application is not particularly limited, and known application methods can be suitably used. For example, methods such as spin coating, spray coating, dip coating, etc. can be used. When a graded refractive microlens is produced, the paste may be dropped onto the substrate using a syringe, a dispensing pipette, or the like, or printing techniques for forming precise circular microdots (for example, ink-jet printing) may be used.

When a diffraction grating is produced, linear patterning may be used. For linear patterning, screen printing as used in dyeing, etc. may be used. When forming a linear pattern, the line width may be suitably determined according to the desired properties of the optical element (diffraction grating). The line width is usually 500 μm or less, preferably 200 μm or less, and more preferably 100 μm or less. To form a very precise pattern, a process comprising patterning a glass substrate surface using an inorganic film according to a photolithographic method and then applying a paste containing a metal compound to the exposed portion of the glass substrate may be used.

In all the above paste application methods, the thickness of the applied paste is not particularly limited and can be suitably determined according to the type, amount, etc. of copper compound contained in the paste. The thickness, however, is usually 2 mm or less, preferably 1.5 mm or less, and particularly preferably 1 mm or less.

After applying the paste, the resulting coating film is usually dried prior to heat treatment. The drying conditions are not particularly limited as long as the film is dried so that the solvent component is sufficiently removed and the paste is dried to a solid. Usually, the coating film can be efficiently dried by heating at a temperature of about 100° C. to about 250° C. for about 30 minutes to about 1.5 hours, and preferably at a temperature of about 150° C. to about 200° C. for about 45 minutes to about 1 hour.

Subsequently, the dried coating film is heat-treated. The heat treatment temperature is usually in the range of about 300° C. to about 600° C., and preferably in the range of about 350° C. to about 550° C., being set at a temperature below the softening temperature of the glass substrate. Although the heat treatment time can be suitably determined according to the temperature, it is usually about 10 minutes to about 100 hours, preferably about 30 minutes to about 50 hours, and particularly preferably about 1 to 25 hours. The heat treatment atmosphere is usually an oxygen-containing atmosphere, such as in air.

Heat treatment by the above-mentioned method allows copper ions to diffuse into the glass substrate. The diffused copper ions exist as $Cu^+$ ions, $Cu_2O$, copper metal fine particles, etc., depending on the treatment conditions. As a result, the portions containing such dispersed copper ions differ in refractive index from the rest of the glass substrate. The refractive index distribution is continuous, and usually, the refractive index at the substrate surface onto which the paste has been applied has the greatest refractive index. The greater the diffusion depth, the smaller is the refractive index. After heat treatment, the substrate is usually allowed to cool to room temperature, and the paste residue remaining on the substrate is washed away with water.

In the production of graded refractive index lenses and refractive index lens arrays by the above method, especially when using as the glass substrate a borosilicate glass substrate containing 40 to 82% by weight of $SiO_2$, 12 to 50% by weight of $B_2O_3$, 2 to 25% by weight of at least one member selected from $Na_2O$, $K_2O$, $Li_2O$, $Rb_2O$ and $Cs_2O$; not more than 25% by weight of at least one member selected from MgO, CaO, BaO, ZnO, SrO and PbO (the minimum amount is preferably about 2% by weight to fully achieve the desired effects); not more than 20% by weight of at least one member selected from $Al_2O_3$, $La_2O_3$, $Y_{203}$, $Ta_2O_3$ and $Gd_2O_3$ (the minimum amount is preferably about 5% by weight to fully achieve the desired effects); not more than 10% by weight of at least one member selected from $Nb_2O_5$ and $ZrO_2$ (the minimum amount is preferably about 1% by weight to fully achieve the desired effects); not more than 5% by weight of at least one member selected from $As_2O_3$, $Sb_2O_3$ and SnO (the minimum amount is preferably about 0.5% by weight to fully achieve the desired effects); and 0.05 to 10% by weight of at least one member selected from Cl, Br and I, the copper ions diffusing into the glass substrate react with at least one kind of halogen atom selected from Cl, Br and I contained in the glass substrate, thus giving copper halide(s). The dispersion of the copper halide(s) imparts ultraviolet absorption effects, improved laser processability, etc. to the interior of the glass.

Graded refractive index optical elements such as graded refractive index lenses, graded refraction index lens arrays, and diffraction gratings can be produced by the above-mentioned process.

For example, graded refractive index lenses can be used for laser beam focus correction, optical coupling between optical fibers, and like purposes. Graded refraction index lens arrays can be used for optical branching in optical communications, parallel image processing, etc. Refraction diffraction gratings can be used for sensor elements, etc.

Effect of the Invention

According to the method of the invention, a continuously varying refractive index distribution can be provided in a desired portion of a glass substrate by simply applying a paste containing a copper compound to a glass substrate containing an alkali metal component and heating in an atmosphere such as air. This method does not require a specific treatment atmosphere (for example, a reducing atmosphere), etc., so that a graded refractive index lens can be produced at low cost without a complicated production process.

Moreover, since the method does not use a molten salt, strict control over a molten salt is not necessary, and the heat treatment temperature and the copper compound concentration in the paste can be controlled independently. Furthermore, unlike immersion in a molten salt, since the paste is applied to a desired portion of the substrate, it is not necessary to mask the substrate surface with a blocking film, etc.

BEST MODE FOR CARRYING OUT THE INVENTION

The present invention is described in further detail with reference to the following Examples. However, the present invention is not limited to the Examples.

Example 1

(Production of a Graded Refractive Index Lens)

A commercially available $SiO_2$—CaO—$Na_2O$ glass (product number: B270, manufactured by Schott) was cut to 10 mm long×10 mm wide×3 mm thick, and washed. A paste of 55% by weight of $CuSO_4$, 10% by weight of $Na_2SO_4$, 15% by weight of acrylic resin, 10% by weight of cellulose resin, and 10% by weight of terpineol (the paste being prepared by mixing 18.2 parts by weight of organic solvent, 45.5 parts by weight of resin component, and 18.2 parts by weight of additive per 100 parts by weight of copper compound) was applied dropwise using a syringe to one side of the glass to form a circle (radius: 0.1 to 0.2 mm) to a thickness of 0.2 mm.

Subsequently, the pasted glass substrate was dried at 200° C. for 1 hour, and then heat-treated in air at 510° C. for 12 hours.

Figure 1:
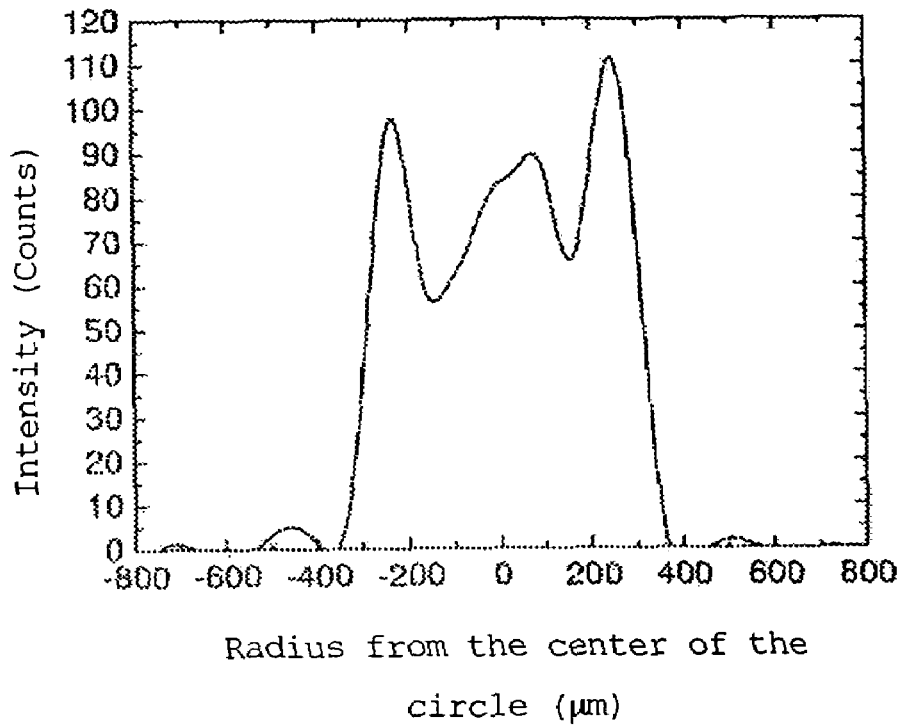
FIG. 1 is a graph of EDX line scanning results, showing the relationship between the distance in the radial direction from the center of the graded refractive index lens obtained in Example 1 and the amount of copper diffused therein.

The copper distribution in the heat-treated sample was determined using an EDX (energy dispersive X-ray analyzer), and it was confirmed that a large amount of copper was distributed (dispersed) within a radius of about 300 μm from the center of the applied paste. FIG. 1 shows the EDX line scanning results.

Figure 2:
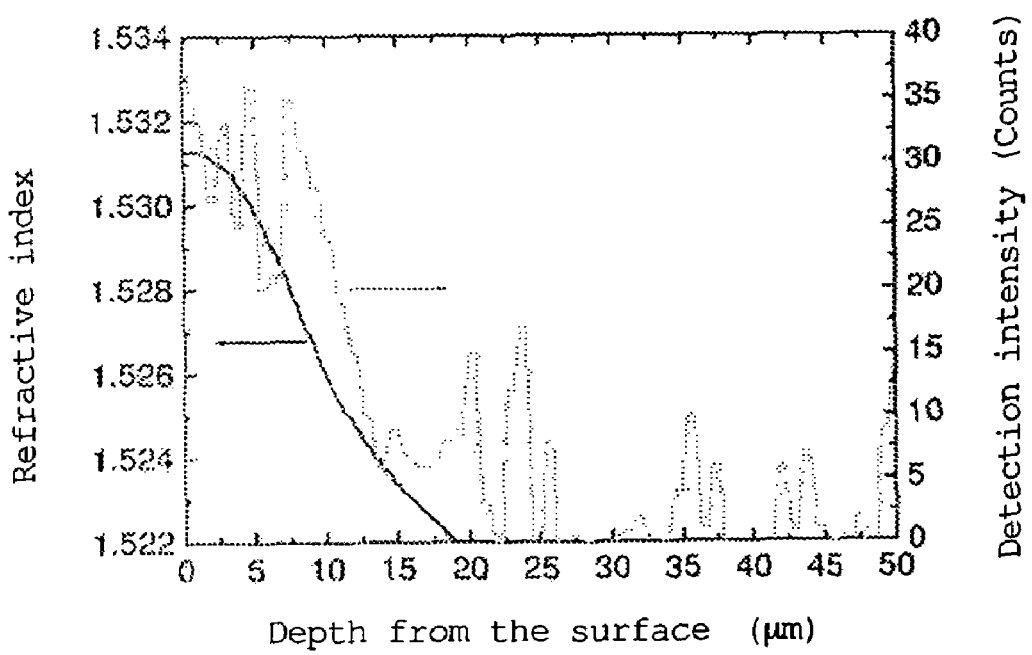
FIG. 2 is a graph showing the relationships between the depth from the substrate surface and the amount of copper diffused and the refractive index, at the center of the graded refractive index lens obtained in Example 1.

The copper distribution in the depth direction was also determined using the EDX, and it was confirmed that the copper was distributed to a depth of about 25 μm. The refractive index distribution in the depth direction of the glass substrate was examined, and it was revealed that the maximum refractive index difference from the glass substrate was about $1\times10^{-2}$, and a graded refractive index distribution extended to a depth of about 20 μm from the surface. FIG. 2 shows the relationships between the depth from the substrate surface and the copper distribution and the refractive index, at the center of the applied paste. The arrows (← and →) in FIG. 2 indicate which graph corresponds to the refractive index and the detection intensity, respectively.

Example 2

(Production of a Graded Refractive Index Lens Array)

A glass (cut glass) and a paste as in Example 1 were prepared.

Figure 3:
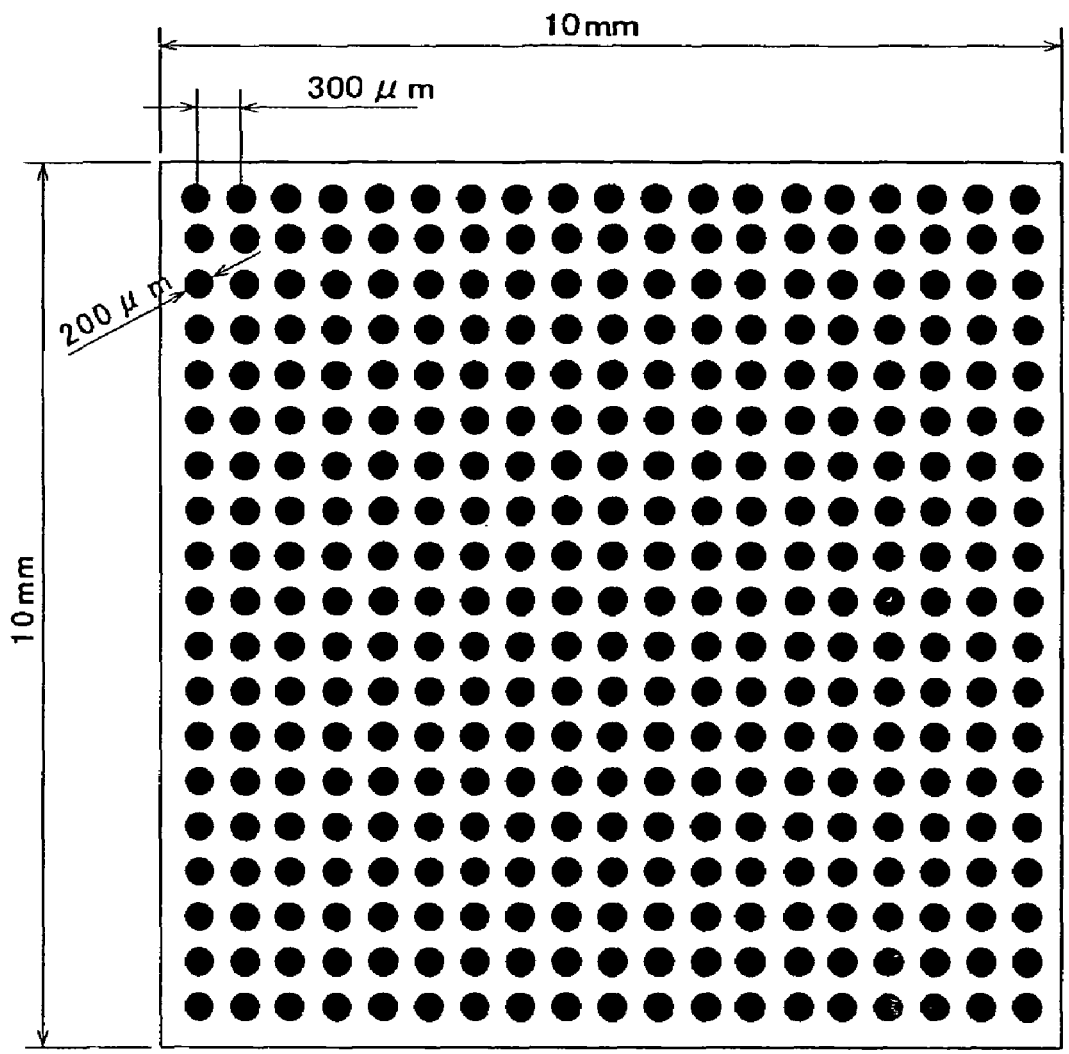
FIG. 3 is a pattern diagram of the patterning of the paste used in the production of the graded refractive index microlens array of Example 2. The diameter of the paste-applied circles is 200 μm, and the patterning interval between the paste-applied circles is 300 μm.

The paste was applied dropwise using a dispensing pipette to one side of the glass to form 20 by 20 circles (diameter: 200 μm, total 400 dots) with a patterning interval (distance from the center of one circle to the center of the adjacent circle) of 300 μm to a thickness of 1 mm. FIG. 3 shows the pattern diagram of the patterning.

Subsequently, the pasted glass substrate was dried at 200° C. for 1 hour, and then heat-treated in air at 500° C. for 12 hours.

The copper distribution in the heat-treated sample was determined using an EDX (energy dispersive X-ray analyzer), and it was confirmed that copper was distributed in the paste-dropped circle portions. The refractive index distribution in the depth direction of the glass substrate was also examined, and it was revealed that the maximum refractive index difference from the glass substrate was about $1 \times 10^{-2}$ and a graded refractive index distribution extended to a depth of about 20 μm from the surface.

The invention claimed is:

1. A method of producing a graded refractive index optical element comprising applying a paste containing a copper compound, an organic resin and an organic solvent to a glass substrate containing an alkali metal component as a glass component and then performing heat treatment at a temperature below the softening temperature of the glass substrate.

2. The method according to claim 1 wherein the graded refractive index optical element is a lens, lens array or diffraction grating.

3. A graded refractive index optical element produced by the method of claim 2.

4. The graded refractive index optical element according to claim 3 which is a lens, lens array or diffraction grating.

5. A graded refractive index optical element produced by the method of claim 1.

6. The graded refractive index optical element according to claim 5 which is a lens, lens array or diffraction grating.

7. The method according to claim 1 wherein the glass substrate is made of a glass containing at least 2% by weight of alkali metal, calculated on an oxide basis, the glass being a silicate glass, borosilicate glass, phosphate glass, or fluorophosphate glass.

8. The method according to claim 7 wherein the glass substrate is a borosilicate glass substrate containing 40 to 82% by weight of $SiO_2$, 12 to 50% by weight of $B_2O_3$, 2 to 25% by weight of at least one member selected from $Na_2O$, $K_2O$, $Li_2O$, $Rb_2O$ and $Cs_2O$; not more than 25% by weight of at least one member selected from MgO, CaO, BaO, ZnO, SrO and PbO; not more than 20% by weight of at least one member selected from $Al_2O_3$, $La_2O_3$, $Y_2O_3$, $Ta_2O_3$ and $Gd_2O_3$; not more than 10% by weight of at least one member selected from $Nb_2O_5$ and $ZrO_2$; not more than 5% by weight of at least one member selected from $As_2O_3$, $Sb_2O_3$ and SnO; and 0.05 to 10% by weight of at least one member selected from Cl, Br and I.

9. A graded refractive index optical element produced by the method of claim 8.

10. The graded refractive index optical element according to claim 9 which is a lens, lens array or diffraction grating.

11. A graded refractive index optical element produced by the method of claim 7.

12. The graded refractive index optical element according to claim 11 which is a lens, lens array or diffraction grating.

* * * * *